United States Patent [19]
Arikawa et al.

[11] 3,832,522
[45] Aug. 27, 1974

[54] WELDING PROCESS AND APPARATUS
[75] Inventors: Masayasu Arikawa; Atsushi Ohi, both of Fujisawa; Toshio Arai, Kamakura; Akihiko Iochi, Odawara; Hironosuke Kada, Fujisawa, all of Japan
[73] Assignee: Kobe Steel, Limited, Kobe, Japan
[22] Filed: July 10, 1972
[21] Appl. No.: 270,008

[52] U.S. Cl............ 219/137, 219/125 R, 219/131 R
[51] Int. Cl............................................. B23k 9/00
[58] Field of Search........ 219/137, 131 R, 131 WR, 219/125 R

[56] References Cited
UNITED STATES PATENTS
| | | | |
|---|---|---|---|
| 3,428,774 | 2/1969 | Faust et al. | 219/137 X |
| 3,555,239 | 1/1971 | Kerth | 219/131 R |
| 3,619,552 | 11/1971 | Cape | 219/125 R |
| 3,646,311 | 2/1972 | Cameron et al. | 219/131 R X |
| 3,681,564 | 8/1972 | Hiyama et al. | 219/125 R |
| 3,689,734 | 9/1972 | Burley et al. | 219/131 R |
| 3,742,184 | 6/1973 | Arikawa et al. | 219/137 X |

Primary Examiner—J. V. Truhe
Assistant Examiner—G. R. Peterson
Attorney, Agent, or Firm—Oblon, Fisher, Spivak, McClelland & Maier

[57] ABSTRACT

In a welding process, the consumable tip of a welding electrode is provided with an oscillating motion, and in one cycle of the oscillation, the characteristics of the arc being generated are changed in two or more ways according to a predetermined program, and the tip is thus advanced in a zigzag manner along the welding line to thereby attain an improved weld zone eliminating defects of the prior art.

12 Claims, 6 Drawing Figures

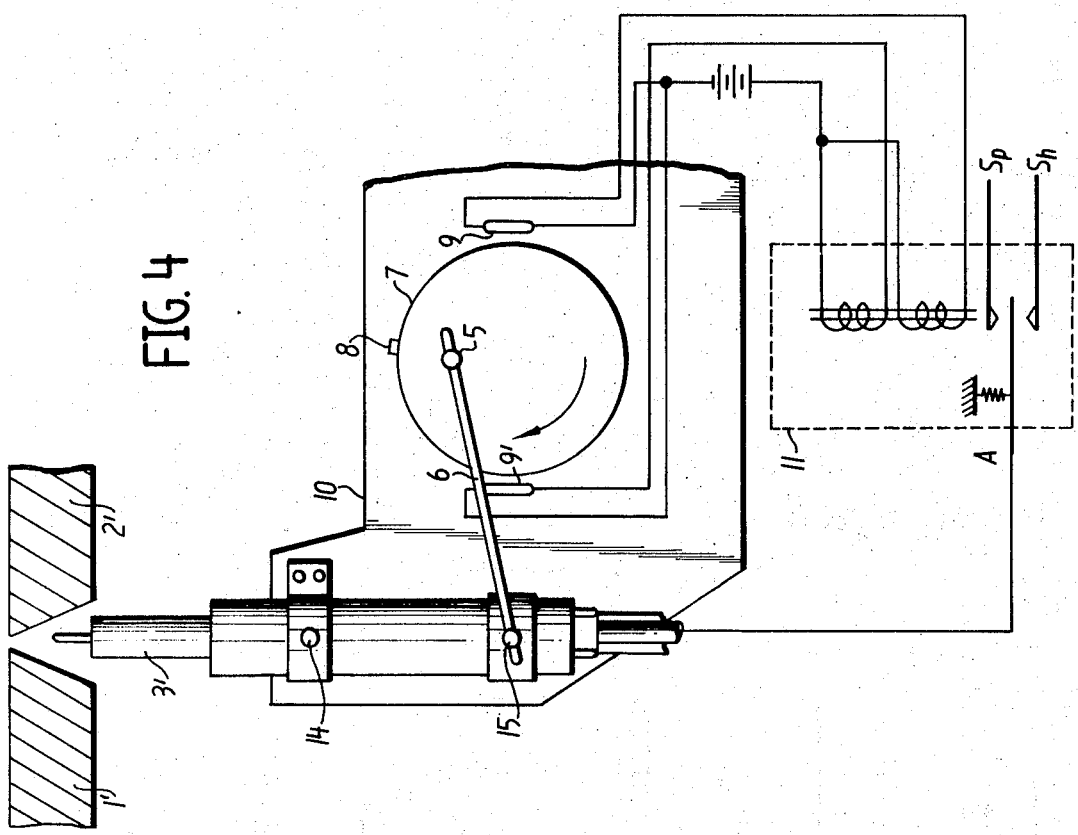
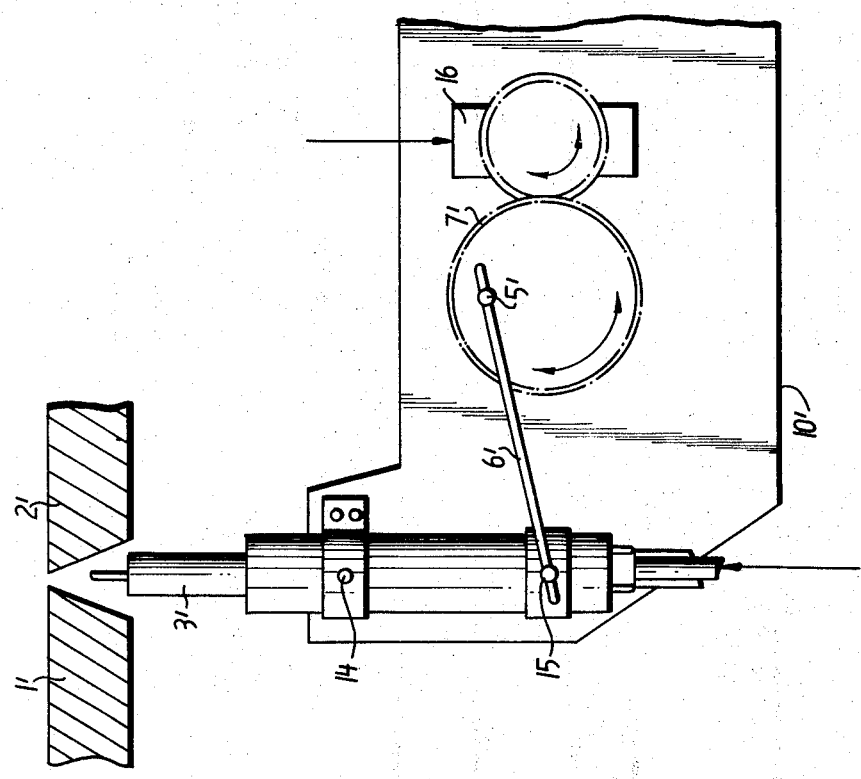

WELDING PROCESS AND APPARATUS

BACKGROUND OF THE INVENTION

1. Field Of The Invention

This invention relates generally to an arc welding process and an apparatus for carrying out this process. More particularly, the present invention relates to an arc welding process and apparatus characterized by the tip of a consumable electrode being oscillated, and in synchronism with this oscillating motion, two or more types of arcs having different characteristics being generated during one reciprocating motion, whereby the electrode is advanced along the weld line in a zigzag manner to attain the welding. For improvement of welds being performed in this manner, it is desirable to overcome both the problems of the lack of fusion with the member to be welded and the dropping down of the bead, which are in a contradicting relationship.

According to this invention, these problems are solved and therefore a satisfactory weld zone can be automatically obtained, independently of butt welding or fillet welding, and of the position of the member to be welded, whether its orientation be horizontal or vertical.

2. Description Of The Prior Art

Heretofore, in general, as the calorific value generated by an arc during welding is increased, the penetration and fusion with the member to be welded is improved, but dropping down of the bead and an unequal leg length of the bead in the case of horizontal fillet welding are liable to result, while as the calorific value is decreased, dropping down of the bead and unequal leg length can be avoided, but at the same time the fusion is degraded.

One known pulse arc welding process attempts to solve such contradicting problems as the lack of fusion, dropping down and unequal leg length of the bead by varying the welding current in a period of 1/50 to 1/100 of a second to periodically supply a pulse of high current. However, since it does not take into consideration the lack of fusion and dropping down and unequal leg length of the bead depending on the position along the weld zone groove as viewed from its cross section, it merely can attain correct control of calorific value of the entire weld zone and control of transfer of molten metal and therefore fails to provide a fundamental solution for such contradicting problems. This tendency becomes particularly remarkable as the thickness of the member to be welded and the size of the groove are increased, and therefore, a short arc welding process providing a low calorific value is used in an operation involving two or more passes to attain the purpose. This prevents automation of the welding process and requires a high degree of skill in operation.

SUMMARY OF THE INVENTION

Accordingly, it is an object of the present invention to provide an improved welding process which provides superior fusion and penetration characteristics while avoiding dropping down of the weld bead and unequal leg length thereof.

Another object of the present invention is to provide an apparatus for welding automatically according to the improved welding process characterized herein to provide a weld having superior fusion and penetration, while avoiding dropping down of the weld bead and unequal leg length thereof.

The present invention takes into consideration the calorific value required for good welding at each position in the cross-section of the weld zone groove, and supplies a different calorific value depending on the position, that is, an arc having a different characteristic depending on the position generated, and thereby fusion with the member to be welded is improved, and dropping down and unequal leg length of the bead are prevented as well. More particularly, this invention imparts an oscillating motion to the tip of a consumable electrode corresponding to each position in the cross-section of the weld zone groove, and generates a plurality of arcs having different characteristics in synchronism with the oscillating motion. By generating an arc due to high current, for example, a spray arc, when the tip of the consumable electrode is in a position nearest to the groove face of the member to be welded, and generating an arc due to low current, for example, a short arc, when the tip is in other positions, not only is the penetration in the groove face improved by the spray arc, but also the supply of excess heat is avoided by maintaining a short arc in most positions, thereby leading to the prevention of the bead from dropping down and an unequal leg length thereof. That is, this invention comprises supplying repeatedly a plurality of types of arc corresponding to each position of the groove, whereby the tip of a consumable electrode is oscillated, and while generating two or more types of arcs having different characteristics during each reciprocating motion in synchronism with the oscillating motion, the tip is advanced along the weld line in a zigzag manner.

BRIEF DESCRIPTION OF THE DRAWINGS

Various other objects, features and attendant advantages of the present invention will be more fully appreciated as the same becomes better understood from the following detailed description when considered in connection with the accompanying drawings.

FIG. 4 is a diagram illustrating one embodiment of an apparatus formed according to this invention;

FIG. 5 is a diagram illustrating another embodiment of an apparatus according to this invention.

DESCRIPTION OF THE ILLUSTRATED EMBODIMENTS

Figure 1:
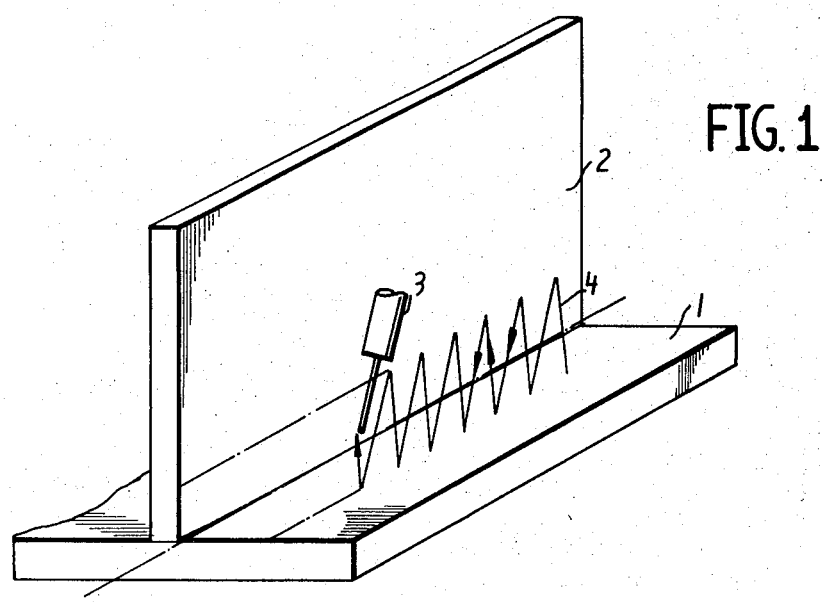
FIG. 1 is a perspective view illustrating the process of manipulation of a consumable electrode in a zigzag fashion, generally along a horizontal line, according to this invention.
Figure 3:
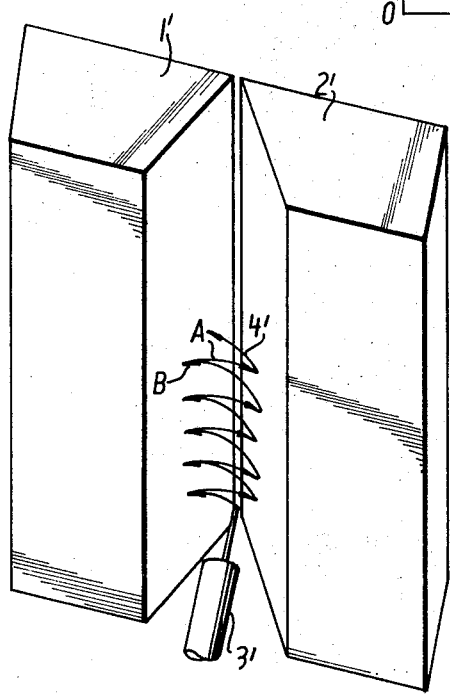
FIG. 3 is a perspective view illustrating an example of the process of manipulation of an electrode in a zigzag manner generally along a vertical line according to this invention.

Referring now to the drawings, and more particularly to FIG. 1, a horizontal plate 1 and a vertical plate 2, which are to be welded, are shown being traversed by a welding wire 3 generally being moved in the direction indicated by an arrow, while following a locus 4. Referring to FIG. 3, on the other hand, thick steel plates 1' and 2' are shown in butt position with a V-groove therebetween, and a welding torch 3' is shown being moved transversely across the groove following a general locus 4. while simultaneously being moved vertically upward, wherein two locuses A and B are indicated.

Examples of the invention will now be described.

EXAMPLE 1

Figure 2:
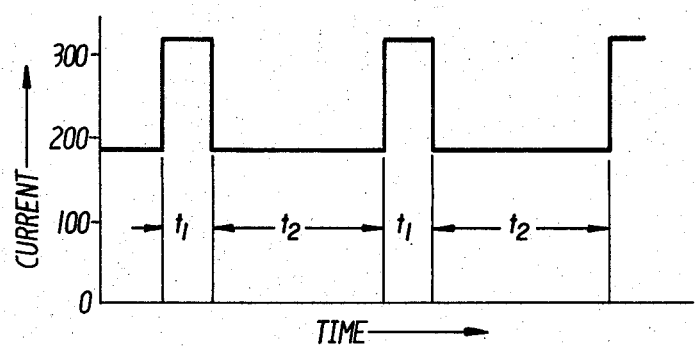
FIG. 2 is a graph showing a relationship between the welding current and the arc generating time according to this invention.

A steel plate of 12 mm thickness was used in the horizontal fillet position, as shown in FIG. 1. While various processes of manipulation of the electrode could be applied in this position of welding, the back-step process, as shown, was used in this example. As shown in the relationship between the welding current and time in FIG. 2, welding was performed by an arc of high current density (280 to 320A/1.6mm dia. = 160A/mm$^2$) during the time $t_1$ of arc generation on the horizontal plate so as to attain improved penetration of the plate and its corner. During the time $t_2$, in which welding was directed to the vertical plate from the corner and then returned to the horizontal plate, the arc was automatically changed to an arc of low current density (150 to 190A/1.6mm dia = 95A/mm$^2$) being determined so as not to produce an undercut in the upper melt line of the vertical plate, while not degrading the shape of the bead cross-section by melting down the deposited bead during downward welding. The operation described above was automatically synchronized with the oscillating motion to maintain the current changing point on a constant line during welding. The welding conditions therefor were as follows:

| | |
|---|---|
| welding wire | : combined wire for $CO_2$ welding(1.6mm) |
| shield gas | : Ar + $CO_2$ |
| high current density arc | : $t_1$ = 0.4 - 0.8 sec.<br>current = 280 - 320A<br>voltage = 29 - 30V |
| low current density arc | : $t_2$ = 1.5 - 3.0 sec.<br>current = 150 - 190A<br>voltage = 18 - 20V |
| travel speed | : 100 - 150 mm/min |
| weaving width | : 20 - 30 mm |

The weld zone obtained in this example is an improved one of equal leg length and having no undercut.

While in the above example, the spray arc phenomenon and the short arc phenomenon were alternately utilized as welding current by merely changing the current intensity from a D.C. source, two or more types of arc phenomena may be utilized by using a pulse arc or a current of special shape.

Furthermore, in the case of the pulse arc, the arc phenomenon changes depending on the intensity of the direct current component, and the transfer state of the molten metal also assumes the spray transfer or similar transfer phenomenon in the case of large currents and assumes a similar transfer phenomenon to the globular or short arc transfer in the case of small currents, which results in substantially the same effect as the employment of two types of arc characteristics, and is included in this invention.

EXAMPLE 2

For vertically positioned thick steel plates, the process of this invention was applied by inserting a spray arc for a very short time into a short arc.

| Practiced Conditions: | | |
|---|---|---|
| steel plate | 32 mm thick soft steel plate | |
| groove shape, size | gap 2 mm, 45°V groove | |
| welding wire | 1.2 mm solid wire | |
| shield gas | Ar + 20% $CO_2$ | |
| welding position | vertical butt | |
| applied position | both sides of groove<br>others | :spray arc<br>:short arc<br>(FIG. 4) |
| current and voltage | spray arc<br>short arc | :250A, 29V<br>:190A, 19V |
| arc generating time | spray arc<br><br>short arc | :all layers 0.2 sec.<br>:0.8 - 20 sec. depending on number of layers |
| torch upward speed | 8 - 15 cm/min, depending on number of layers | |

As a result of this example, it was found that dropping down of molten metal did not occur, and a relatively smooth bead shape was obtained. Also, common defects, such as lack of fusion on both sides of the groove did not occur.

EXAMPLE 3

The process of this invention also was applied to vertically positioned steel plates, wherein a spray arc was generated on both sides of the groove, which was then interrupted for a very short time, and then a short arc was generated in the vicinity of the groove center. The welding position, the steel plate, the shape and size of the groove, the welding wire and the shield gas were the same as those in Example 2, except that the following conditions were practiced.

| Practiced Conditions: | |
|---|---|
| applied arc and position | spray arc on both sides of the groove<br>- arc interruption -<br>short arc at the central portion of the groove |
| welding current and voltage | spray arc : 250A, 29V<br>short arc : 160A, 17V |
| duration of arc generation and interruption | spray arc : 0.2 sec for all layers<br>arc interruption : 0.2 sec for all layers<br>short arc : 0.6 - 1.6 sec depending on the number of layers |

As a result of this example, it was found that the tendency of the molten metal to drop down during welding was decreased, welding was easily performed, and defects such as the lack of fusion on both sides of the groove were not produced.

EXAMPLE 4

In this example, an apparatus is described which synchronizes the arc current with the displacement of the welding torch by using a contact, such as a reed switch, in a vertical butt welding process.

As shown in FIG. 4, a torch 3' opposing the steel plate members 1' and 2' to be welded and having a groove formed therebetween is mounted on a pivot axis 14. A pin 15 attached to the rear portion of the torch 3' and a pin 5 on a rotary disc 7 driven by an electric motor, not shown, are connected through a rod 6 to thereby convert the rotation of the disc 7 into oscillating motion of the torch back and forth across the groove formed between the plate members. A permanent magnet 8 is attached to the periphery of the rotary disc 7, and at positions corresponding to the permanent magnet 8 around the rotary disc 7, shown as being two in number and diametrically opposed, reed switches 9 and 9' are fixed to a support 10, so that the passing of the permanent magnet 8 nearby the reed switches 9 and 9' is effective to activate them. A relay 11 is provided to be activated by the reed switches 9 and 9' to switch the arc current, a terminal S$p$ thereof being connected to a spray arc power source and another terminal S$h$ thereof being connected to a short arc power source. When current is not flowing through the relay 11, the terminal S$h$ is connected to a terminal A, and when current flows through the relay 11, that is, when the magnet 8 passes one of the reed switches 9 and 9' causing it to be activated, the terminal S$p$ then becomes connected to the terminal A, while the terminal S$h$ is disconnected.

The operation of this apparatus in welding will now be described. After positioning the support 10 so as to properly oppose the tip of the torch 3' to the groove between the members 1' and 2', the rotary disc 7 is rotated. The tip of the torch 3' thereby oscillates right and left within the groove. On the other hand, since the pin 5 on the rotary disc 7 is disposed approximately on the same radial line as the magnet 8, when the magnet 8 comes nearest the reed switch 9, the tip of the torch 3' also comes nearest the member 1'. This condition activates the reed switch 9 to cause current flow in the relay 11, whereby the power source for the spray arc is supplied. As the rotary disc 7 further rotates, the magnet 8 moves away from the reed switch 9, and the tip of the torch 3' moves from the member 1' toward the other member 2'. During this movement, there is no current flow through the relay 11, the torch 3' thus being supplied with the power source for a short arc. When the tip of the torch 3' approaches the member 2', the reed switch 9' is activated to thereby again supply the torch 3' with the spray arc power. Thus, when the tip of the torch 3' approaches the members 1' and 2', a spray arc is generated, and when the tip of the torch 3' moves away from the members 1' and 2' and is moving therebetween, a short arc is generated, and this cycle is continuously repeated while the torch is moved vertically upward along the groove, as shown in FIG. 3.

While this apparatus is described as employing two reed switches for controlling two types of arc power sources, it is also possible to construct an apparatus of similar design which employs more than two reed switches and controls more than two arc power sources.

EXAMPLE 5

In this example, there is described an apparatus for use in vertical butt welding which is provided with an oscillator generating a signal at a constant time interval and on the basis of this signal, the control of the arc power source is synchronized with the displacement of the welding torch.

This apparatus, as shown in FIG. 5, employs a torch 3' disposed in opposing relation to the steel plate members 1' and 2' to be welded and having a vertical groove therebetween, and being mounted on a pivot axis 14. A pin 15 attached to the rear portion of the torch 3' and a pin 5' on a rotary disc 7' driven by a timing motor 16, such as a synchronous or pulse motor, are connected through a rod 6', so that rotation of the rotary disc 7' is converted to oscillating motion of the torch 3' back and forth across the groove in a transverse, or right and left, direction. The timing motor 16 can be made so as to select the rotation direction and the rotation angle by the current, including pulse current, flowing therethrough, and as a result, any oscillating width, or amplitude, of the torch tip can be selected without changing position relationships of the pivot axis 15, pins 15 and 5', and rod 6'.

Figure 6:
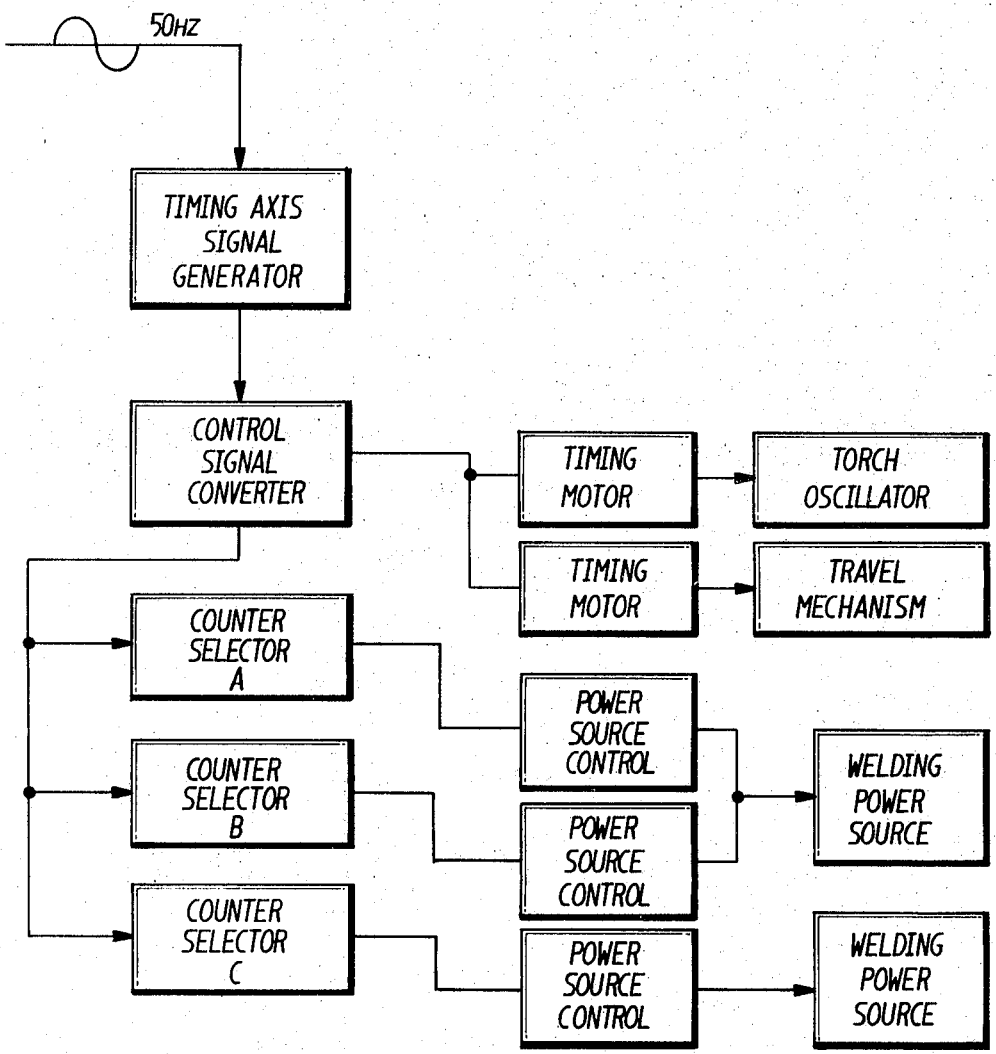
FIG. 6 is a diagram illustrating an apparatus for controlling the embodiment illustrated in FIG. 5.

An apparatus which activates the timing motor 16 and controls the arc power source being supplied to the torch 3', and synchronizes the motion of the timing motor 16 with the control of the arc power source, will now be described by reference to FIG. 6. A timing axis signal generator which converts the sine wave of a readily available 50 cycle signal to a square wave and generates a signal at a constant time interval is used to generate a pulse signal at every 0.02 sec. Taking into consideration the minimum time unit required for control of the motion of the timing motor 16 and the arc power source, a basis pulse signal at every 0.1 sec is sufficient, and therefore the pulse signal at every 0.02 sec is converted to a pulse signal at every 0.1 sec by a control signal converter, and this is taken as the basis pulse. The timing motor 16 is rotated by this basis pulse to perform the oscillation of the torch 3'. Although not shown in FIG. 5, in order to drive a travel mechanism moving the support 10 itself vertically along the welding line, a timing motor for the travel mechanism can also be provided in the same manner as the timing motor for the oscillating motion.

The basis pulse is further supplied to several counter selectors, and each of the counter selectors counts the basis pulse at a fixed period according to a predetermined program, and when a fixed time has elapsed in the period, that is, when a fixed number of basis pulses has been counted, a signal is generated so as to open or close the arc power source. For instance, assuming that one period is one second and two types of arc power sources are used, then, when the timing motor 16 causing the oscillating motion of the torch 3' has received 10 of the basis pulses, the rotary disc 7' causes one rotation, as adjusted. As a result, the torch tip repeats an oscillating motion of one cycle in each second. A counter selector A counts five pulses from a starting point in a period before restarting the next period, and generates a signal between the second pulse and the fifth pulse received. A counter selector B has the same period of five basis pulses as the counter selector A, and generates a signal between the third pulse and the fourth pulse received. A counter selector C has the same period as the counter selectors A and B, and generates a signal between the third pulse and the fourth pulse received. Thus, the signal generated from the counter selector A is used to supply a short arc power source to the torch 3', and the signal generated from the counter selector B is used to cut the short arc power source, while the signal generated from the counter selector C is used to supply a spray arc power source to the torch 3'. After thus setting each of the counter selectors A, B and C, when these control systems are operated at the same time with the torch tip positioned at the correct center of the oscillation amplitude, spray arc current for about 0.1 sec flows upon approach of the tip of the torch 3' to the member to be welded, and short arc current flows during the remaining oscillating motion except in the central travel for about 0.2 sec. No current flows through the torch 3' for about 0.2 sec during which the tip of the torch 3' passes through the central portion of the oscillating amplitude.

Thus, the welding can be performed by synchronizing the control of arc current with the displacement of the welding torch.

Obviously many modifications and variations of the present invention are possible in light of these teachings. It is to be understood therefore that within the scope of the appended claims, the invention may be practiced otherwise than as specifically described herein.

What is claimed as new and desired to be secured by letters patent of the United States is:

1. A process of welding comprising the steps of:
    oscillating the tip of a consumable electrode across a welding line;
    generating an arc of a spray-type transfer and an arc of a dip-type transfer in each cycle of oscillating motion in synchronism therewith, wherein during said oscillating motion, said arc of the spray-type is generated when said tip approaches the extreme positions of said oscillating motion and said arc of the dip-type transfer is generated at the other positions of said oscillating motion; and
    advancing the tip along said welding line, whereby the tip moves in a zig-zag manner across and along said welding line.

2. A process according to claim 1, wherein the arc of the spray-type transfer is generated for 0.2 – 0.8 sec.

3. A process according to claim 1, wherein the arc of the spray-type transfer being generated is 280 – 320A at 29 – 30V, and the arc of the dip-type transfer being generated is 150 – 190A at 18 – 20V.

4. A process of welding according to claim 1, further comprising interrupting the arc after each arc of the spray-type transfer is generated, thereafter generating an arc of the dip-type transfer.

5. A process of welding comprising the steps of:
    oscillating the tip of a consumable electrode across a welding line;
    generating an arc of a spray-type transfer and an arc of a pulsed type transfer in each cycle of oscillating motion in synchronism therewith, wherein during said oscillating motion, said arc of the spray-type transfer is generated when said tip approaches the extreme positions of said oscillating motion and said arc of the pulsed-type transfer is generated at the other positions of said oscillating motion; and
    advancing the tip along said welding line, whereby the tip moves in a zig-zag manner across and along said welding line.

6. A process according to claim 5, wherein the arc of the spray-type transfer is generated for 0.2 – 0.8 sec.

7. A process according to claim 5, wherein the arc of the spray-type transfer being generated is 280 – 320A at 29 – 30V, and the arc of the pulsed-type transfer being generated is 150 – 190A at 18 – 20V.

8. A process according to claim 5, further comprising interrupting the arc after each arc of the spray-type transfer is generated, thereafter generating an arc of the pulsed-type transfer.

9. A process of welding comprising the steps of:
    oscillating the tip of a consumable electrode across a welding line;
    generating an arc of a globular-type transfer and an arc of a dip-type transfer in each cycle of oscillating motion in synchronism therewith, wherein during said oscillating motion, said arc of the globular-type transfer is generated when said tip approaches the extreme positions of said oscillating motion and said arc of the dip-type transfer is generated at the other positions of said oscillating motion; and
    advancing the tip along said welding line, whereby the tip moves in a zig-zag manner across and along said welding line.

10. A process according to claim 9, wherein the arc of the globular-type transfer is generated for 0.2 – 0.8 sec.

11. A process according to claim 9, wherein the arc of the globular-type transfer being generated is 280 – 320A at 29 – 30V, and the arc of the dip-type transfer being generated is 150 – 190A at 18 – 20V.

12. A process according to claim 9, further comprising interrupting the arc after each arc of the globular-type transfer is generated, thereafter generating an arc of the dip-type transfer.

* * * * *